US005471531A

United States Patent [19]

Quan

[11] Patent Number: 5,471,531

[45] Date of Patent: Nov. 28, 1995

[54] METHOD AND APPARATUS FOR LOW COST AUDIO SCRAMBLING AND DESCRAMBLING

[75] Inventor: Ronald Quan, Cupertino, Calif.

[73] Assignee: Macrovision Corporation, Sunnyvale, Calif.

[21] Appl. No.: 145,066

[22] Filed: Dec. 14, 1993

[51] Int. Cl.[6] .......... H04N 7/167

[52] U.S. Cl. .......... 380/19; 380/31; 380/38; 380/39; 380/40

[58] Field of Search .......... 380/19, 31, 38, 380/39, 40

[56] References Cited

U.S. PATENT DOCUMENTS

| | | | |
|---|---|---|---|
| 3,777,064 | 12/1973 | Allen et al. | 380/31 X |
| 4,148,063 | 4/1979 | Chomet | 380/19 |
| 4,636,853 | 1/1987 | Forbes et al. | 380/31 |
| 4,652,699 | 3/1987 | Akaiwa | 380/31 |
| 5,058,159 | 10/1991 | Quan | 380/19 |
| 5,144,666 | 9/1992 | Le Van Suu | 380/19 |
| 5,159,631 | 10/1992 | Quan et al. | 380/19 |

*Primary Examiner*—David C. Cain
*Attorney, Agent, or Firm*—Gerow D. Brill

[57] ABSTRACT

Audio signals are descrambled by double sideband modulating the scrambled audio signal with a modulation carrier having a carrier frequency slightly above the highest audio signal present in the scrambled audio. This produces a double sideband signal that is passed through a low pass filter which in turn is modulated by a second carrier frequency lower than the first carrier signal by an amount equal to the offset spectrum of the original scrambled signal. The first low pass filter nulls out any residual carrier from the first modulator that results from the of intermodulation of the two modulation frequencies that would be audible at its descrambler output. The modulators used are low noise switch type modulators that improve the signal to noise ratio in the descrambled signal over the previously used linear modulators. The use of switch type modulators provides a lower cost device with improved performance. A companion scrambling device uses similar techniques to provide improved performance at a lower cost.

50 Claims, 11 Drawing Sheets

7 POLE ELLIPTIC LOW PASS FILTER ~17KHz BW

METHOD AND APPARATUS FOR LOW COST AUDIO SCRAMBLING AND DESCRAMBLING

BACKGROUND

This invention relates to techniques for low cost scrambling and descrambling of audio information signals. More particularly, this invention relates to a lower cost Hi Fi descrambler with an improved performance over the prior art.

The prior art in the art of audio scrambling and descrambling utilized various frequency shifting techniques. The prior arts in audio descrambling suffer from hiss in the form of "white noise", and more importantly in band carrier "whistle caused by intermodulation of the two carrier frequencies. The prior arts also use expensive circuitry such as band pass filters for mixer circuits, wide band 0 degree and 90 degree all pass networks and 0 degree and 90 degree circuits for varying the carrier frequencies with constant amplitude and the need for adjustments to balance gain of quadrature mixers for sideband elimination. In addition, since the mixers used in the prior art are generally not stable in time, their drift results in an audible whistle as the result of carrier leak through.

The prior art requires mixers that require a pure sine wave modulation, therefore a truly analog multiplier is needed. Truly analog multipliers tend to have noise problems because of their circuit configuration that cause white thermal or shot noise components that degrade the signal to noise (SNR) of the audio scrambling system.

Prior art systems having one or more of the identified problems include U.S. Pat. Nos. 4,636,853 ('853), DYNAMIC AUDIO SCRAMBLING SYSTEM, by Forbes issued on Jan. 13, 1987, 5,058,159, METHOD AND SYSTEM FOR SCRAMBLING AND DESCRAMBLING AUDIO INFORMATION SIGNALS by Quan issued on Oct. 15, 1991, and 35,159,631, AUDIO SCRAMBLING SYSTEM USING IN BAND CARRIER, by Quan et al. issued on Oct. 27, 1992 ('159).

A review of the prior art for a full understanding of the present invention will be helpful. Turning now to the drawings, FIG. 1 is a block diagram of the key elements of the Forbes '853 prior art. The Forbes '853 descrambler 10 has a scrambled audio input 34 which is connected to an all pass phase shifter 20 containing a 0 deg. output 38 and a 90 deg. output 39. The scrambled audio signal has an offset frequency 36 $f_1$–$f_2$ as shown in FIG. 2*a*. This shows the scrambled audio offset by an offset frequency determined by the scrambling process. The phase shifted outputs are connected to a first input of linear modulators 21 and 27.

A frequency generator 22 generates a square wave frequency ($f_1$) which is fed to band pass filter 24 to remove any harmonics, thus producing a pure sine wave. This $f_1$ sine wave is connected to a 0 deg. and 90 deg. phase shifter 25. The outputs of phase shifter 25 are in turn connected to second inputs of linear modulators 21 and 27 respectively. The outputs of the first and second linear modulators are added in summer 28 to produce signal 37. This output signal 37 is connected to a first input of a second mixer 30 via high pass filter 29 which passes only $f_1$ and the upper sideband as shown in FIG. 2*b*.

A second square wave frequency generator 23 generates a signal $f_2$ as shown FIGS. 1 and 2*c*. This square wave is filtered by band pass filter 26 to remove any harmonics to produce a pure sine wave signal. This pure sine wave signal is connected to a second input of third mixer 30. The output of the third mixer 30 is connected to a low pass filter 31 to produce a descrambled output signal 35, as shown in FIG. 2*d* and 30 as shown in FIG. 1.

The second spectral diagram in FIG. 2*b* shows the input to the 3rd mixer 30. The frequency $f_1$ here represents the residual carrier feed through from mixers 21 and 27. FIG. 2*c* shows a shows the relationship of a carrier $f_2$ to $f_1$ in FIG. 2*b* and the scrambled audio signal shown in FIG. 2*a*. FIG. 2*d*, shows the relationship of the spectral characteristics of the descrambled signal 35 and the residual difference frequency ($f_1$–$f_2$) component to the spectral characteristics of the signals in FIGS. 2*a*–2*c*.

FIG. 4 shows the scrambled audio input of the Quan prior art descrambler 11. This shows the scrambled audio 40 offset by an offset frequency determined by the original scrambling process. As shown in FIG. 3, the scrambled audio input signal 40 is connected to an all pass shifter 4 which provides 0 deg. and 90 deg. phase shifted outputs 42 and 43 to first inputs of first and second mixers 44 and 45.

Carrier frequency generator 46 generates a sine wave signal $f_c$ 47 with a frequency of 1 Khz or 2–3 khz. The carrier frequency 47 is filtered by a low pass filter 48 to remove any harmonics to produce a pure sine wave 49. This pure sine wave signal 49 is connected to an all pass phase shifter 50 to produce 0 deg. and 90 deg signals 51 and 52 which in turn are connected to second inputs of mixers 44 and 45. The outputs of mixers 44 and 45, signals 53 and 54 are connected to summer 55 to produce descrambled output 56.

FIG. 4*b* shows the relationship of the in band descrambling carrier $f_c$ to the scrambled audio signal. FIG. 4*c* shows the descrambled audio spectrum with the residual carrier $f_c$ that is typically −60 db below the descambled audio program, but is still audible during silent passages of the audio program.

It is therefore an object of this invention to provide a higher performance descrambler and/or lower cost frequency shifted scrambled audio signals. The method and apparatus described 1) eliminates the use of 0 degree and 90 degree phase shift circuits, 2) eliminates the use of quadrature mixer circuits, 3) eliminates the need for band pass filters or low pass filters for the modulating carrier, 4) reduces white noise and cost using switching type mixer circuits instead of linear mixers, 5) eliminates in-band audible whistle via filtering out the residual first carrier whistle; 6) eliminates the need to adjust mixers for minimum in-band carrier whistle and 7) since the SNR has been improved the need for noise reduction circuits has been eliminated.

BRIEF DESCRIPTION OF THE DRAWINGS

FIGS. 2*a*, 2*b*, 2*c* and 2*d* are spectral diagrams of the system in the Forbes prior art;

FIGS. 4*a*, 4*b*, 4*c*, and 4*d* are spectral diagrams of the Quan et al. prior art;

SUMMARY

Figure 1:
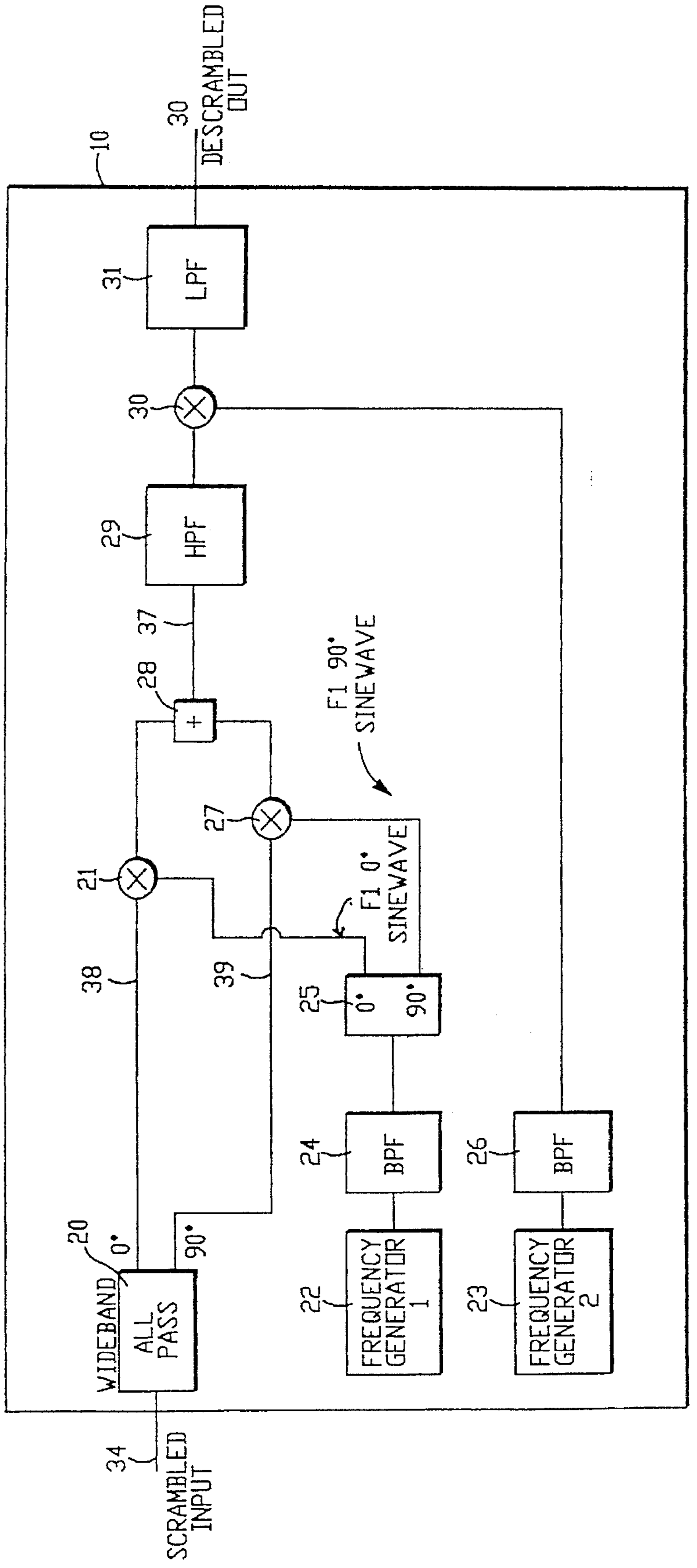
FIG. — 1 (PRIOR ART)
FIG. 1 is a block diagram of the key elements of the Forbes prior art.
Figures 2A, 2B, 2C, 2D, 4A, 4B, 4C:
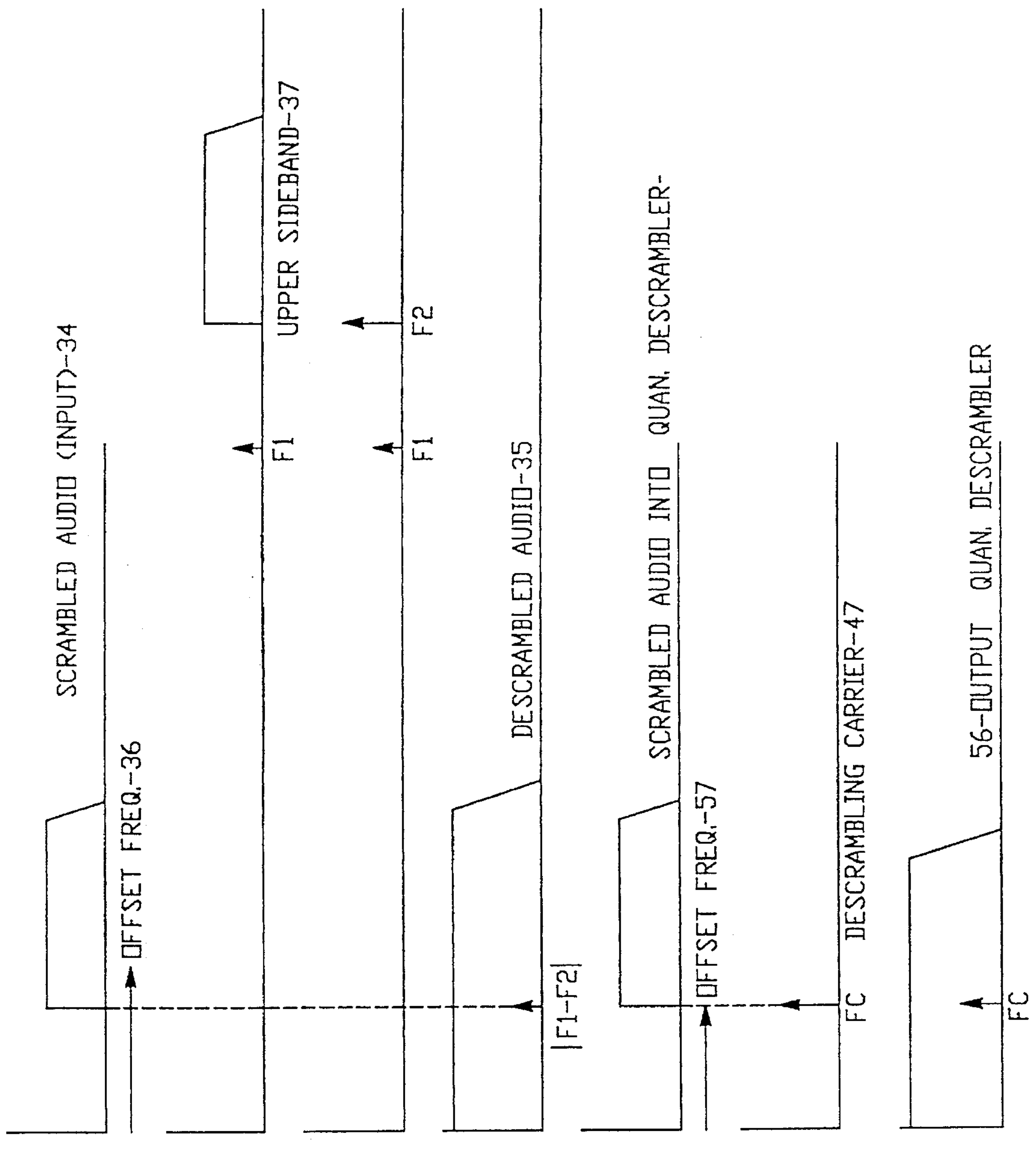
FIG.—2A (PRIOR ART)
FIG.—2B (PRIOR ART)
FIG.—2C (PRIOR ART)
FIG.—2D (PRIOR ART)
Figure 3:
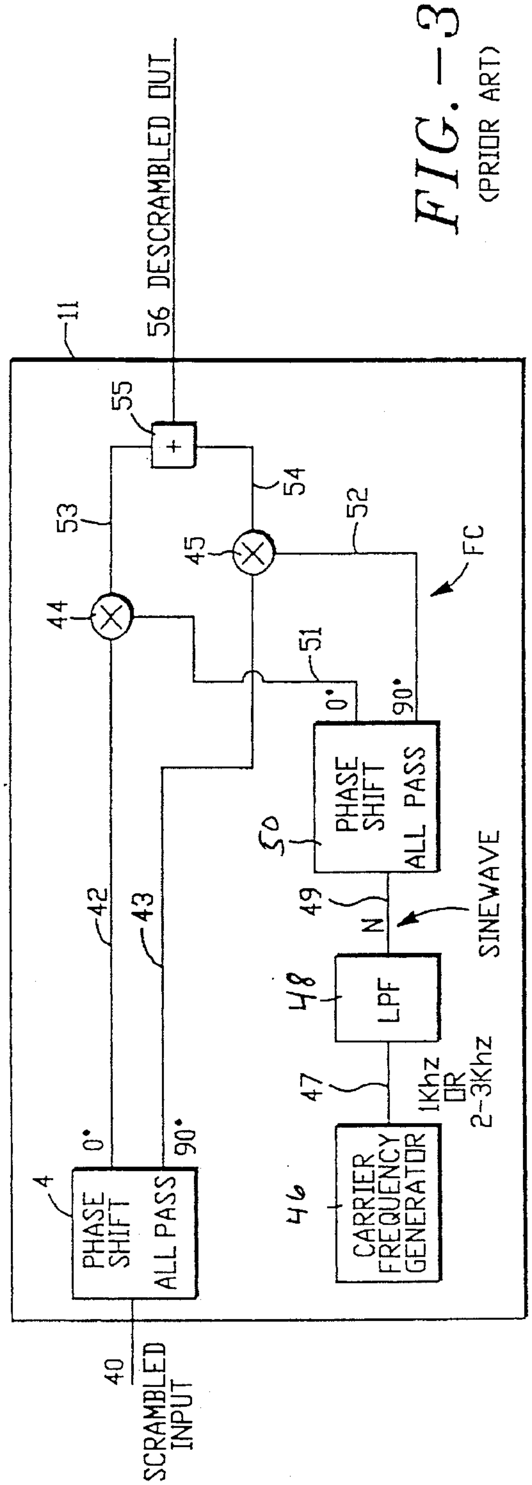
FIG. —3 (PRIOR ART)
FIG. 3 is a block diagram of the key elements of the Quan et al. prior art.

The present invention is directed to a method and system for descambling frequency shifted scrambled audio signals that satisfies the needs described above. The invention comprises a method and system for descrambling frequency shifted scrambled audio signals.

The descrambling system described descrambles a scrambled frequency translated audio information signal by generating a modulation carrier signal at a frequency lying outside the original frequency spectral range of an scrambled audio signal of about 50 Hz to about 15 Khz by first generating a first modulation carrier signal having a frequency greater than the highest frequency in the original audio signal. This first modulation carrier is used for double sideband modulating the scrambled audio signal into a first modulation frequency, a first upper sideband signal and a first lower sideband signal. This set of signals is filtered by a filter to filter out the first modulation frequency, all its harmonics, and the upper sideband signal and its harmonics from the double sideband signal and passing the first lower sideband signal.

A second modulation carrier frequency having a frequency less than the first modulation frequency is generated. This second modulation frequency is connected to a second modulating means for double sideband modulating the first lower sideband signal with the second modulation carrier frequency to produce a second modulating frequency, a second upper sideband signal and a second lower sideband signal.

A second filter passes the second lower sideband signal to produce a descrambled audio signal.

The modulators used are low noise switch type modulators that improve the signal to noise ratio in the descrambled signal over the previously used linear modulators. The use of switch type modulators provides a lower cost device with improved performance.

A companion scrambling device uses similar techniques to provide improved performance at a lower cost. The method of scrambling of an original audio signal of about 50 Hz to about 15 Khz comprises: generating a first modulation carrier signal having a frequency greater than the highest frequency in the original audio signal; quadrature modulating said original audio signal into a first lower sideband signal; filtering out the first modulation frequency and all its harmonics, at least part of the upper sideband signal and all the harmonics from the modulated signal and passing said first lower sideband signal; generating a second modulation carrier frequency having a frequency higher than the first modulation frequency; double sideband modulating the first lower sideband signal with the second modulation carrier frequency to produce a second modulating frequency, a second upper sideband signal and a second lower sideband signal; filtering the second modulating frequency, part of the second upper sideband signal and the second lower sideband signal to pass the second lower sideband signal to produce a scrambled audio signal.

·From a method standpoint, the invention broadly comprises frequency translating the original spectrum of audio information signals to produce scrambled audio information signals by generating a modulation carrier signal having a frequency lying outside the frequency spectral range of the audio information signals, and first single side band modulating followed by double side band modulating the original information signals with the modulation carrier signal to translate the frequency of the original audio information signal in a given direction. Preferably, the frequency of the modulation carrier signal(s) are varied during generation in a pseudo random fashion, particularly by sweeping the frequency of the modulation carrier signal between predetermined limits. The step of varying the frequency of the modulation carrier signal preferably includes the steps of initiating a frequency varying operation in response to a first control signal at a rate determined by a second control signal.

For a fuller understand of the nature and advantages of the invention, reference should be made to the ensuing detailed description taken in conjunction with the accompanying drawings.

DESCRIPTION

Figure 5:
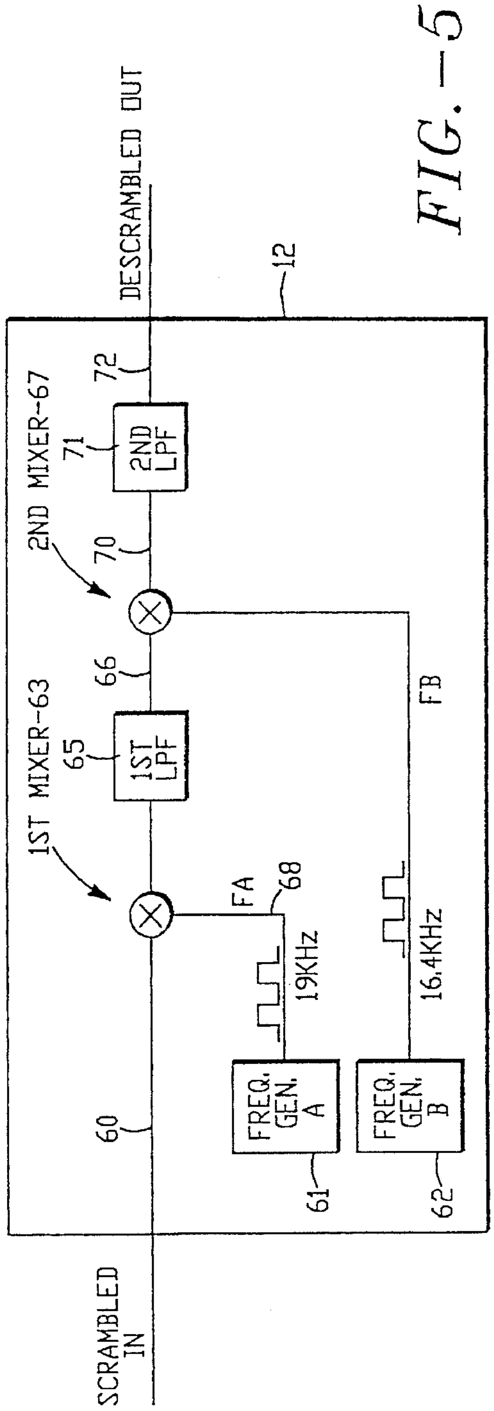
FIG. 5 is a block diagram of the preferred embodiment.
Figures 6A, 6B, 6C, 6D, 6E, 6F, 6G:
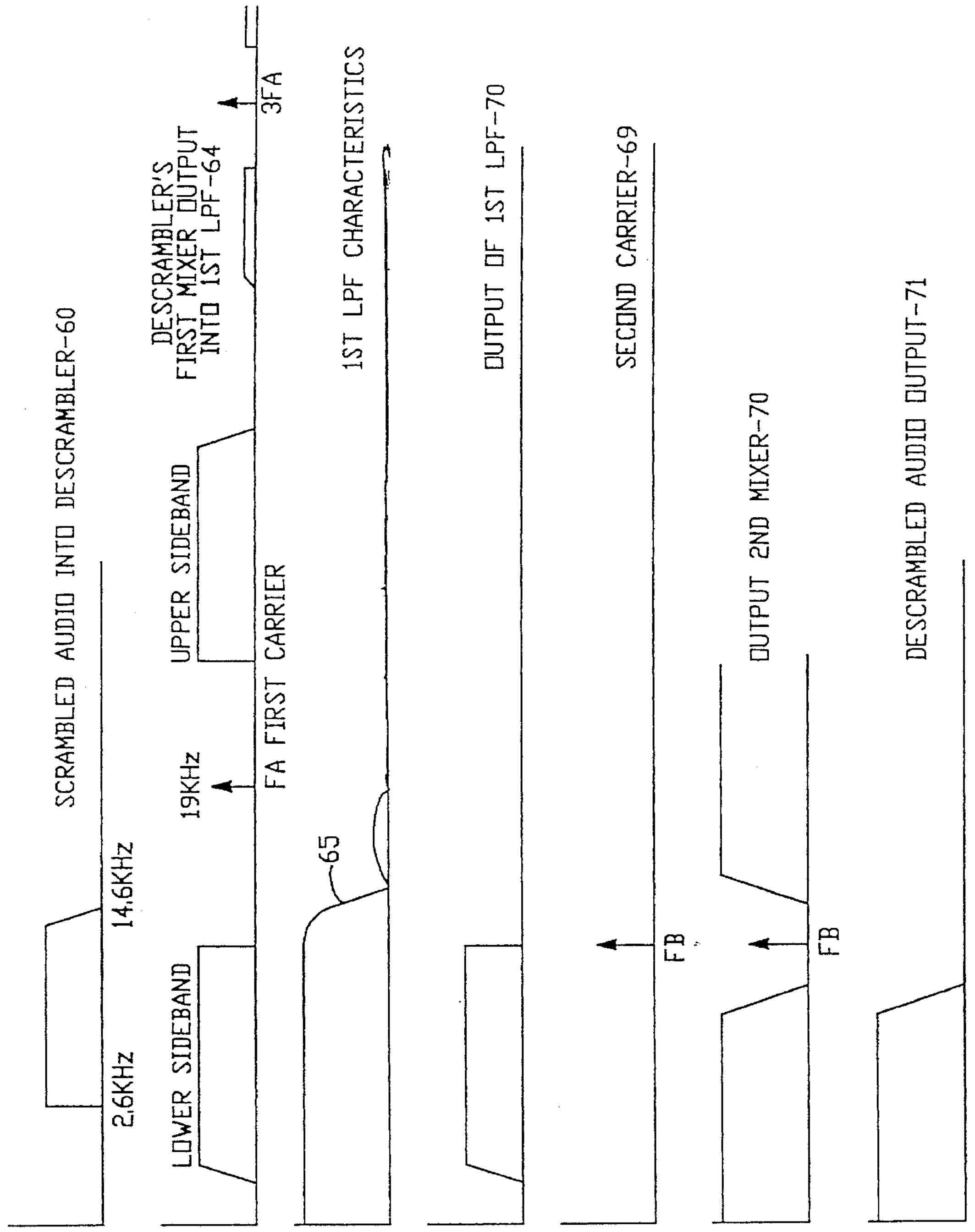
FIGS. 6*a*, 6*b*, 6*c*, 6*d*, 6*e*, 6*f* and 6*g* are spectral diagrams of the preferred embodiment of the descrambler described on FIG. 5.

FIG. 5 shows a block diagram and FIG. 6 shows a spectral diagram of the preferred embodiment of the instant disclosure. FIG. 6*a* shows the spectral characteristic of the scrambled audio input of the preferred embodiment. This shows the scrambled audio offset by an offset frequency determined by the scrambling process. FIG. 6*b* shows the relationship of the first mixer's carrier and the output of the first mixer. Both the upper and lower sidebands and the residual carrier $f_A$ plus the harmonics of all of these are at the first mixer's output. FIG. 6*c* shows the filter characteristics of the first LPF following the first mixer's output. It is crucial that this first LPF filter out the residual carrier and its upper sideband harmonics. FIG. 6*d* the output of the spectral characteristic of the output of the first LPF following the first mixer's output.

FIG. 6*e* shows the relationship of the second carrier to the output of the first LPF to form the last descrambling step. FIG. 6*f* shows the relationship of the descambled audio that has passed through a 2nd LPF with a 12 khz cut-off to filter out $f_B$ and its upper sideband above $f_B$ with the absence of whistle frequency component ($f_a$–$f_b$). The ($f_a$–$f_b$) whistle frequency component is typically equal or less than −85 db in the descrambled audio.

In this preferred embodiment $f_A$ is about 19 Khz and $f_B$ is about 16.4 Khz. These choices are for economy, since with these frequencies the first LPF can be designed inexpensively. If increased performance at a greater cost is desired, the carrier frequencies can be higher in order to minimize leakage of components from the scrambled audio input so as to not interfere with the lower sideband output of the first mixer. Note that in FIGS. 6*a* and 6*b* there is an overlap between the spectra of the lower sideband frequencies and the scrambled audio frequencies. If the first mixer feeds through enough of the scrambled audio, distortion products will occur at the descrambled output. By setting the carrier frequencies to for example $f_A$= 39 Khz and $f_B$=36.4 Khz scrambled input leak through will not cause distortion products at the descrambled output since it will not overlap with the lower sideband of the first mixer i.e. 36.4 Khz. to 24 Khz. versus 2.6 Khz to 14.6 Khz of the scrambled input. However raising $f_A$ and $f_B$ two fold causes the steepness of the first LPF to increase to about two fold. This would require higher order filters such as a 10 pole elliptical low pass filter.

Minimal carrier leakage and scrambled audio leakage with lower shot noise is achieved by using a double throw single pole analog switch such as the 74 HCT 4053 or its equivalent i.e. MC1496 switch type mixer with a carrier input equal to or more than 350 mv p-p.

It was found, for instance, with a CD 4053 analog switch the "on" resistance resulted in a measured noise of 2.5 nv/ /Hz which translates into a noise resistance ($\sqrt{4kTBr}$=$V_N$=2.5 nv/ /Hz, B= 1 Hz, T= 298° Kelvin, k= Bolzman's constant and R= noise resistance) of 400 ohms. The "on" resistance of the CD 4053 was measured to be 440 ohms. Thus it was found experimentally that the "on" resistance of the analog switch (i.e. 4053) produces the same amount of noise as a resistor component of the same resistance. Thus an "on" resistance of 440 ohms in a CD4053 has essentially the same noise as a 440 ohm resistor.

Linear modulators such as the AD 534 produces 0.6 mv RMS over a 10 Khz bandwidth or a noise density of 0.6 mv/ $\sqrt{10Khz}$=60 nv//Hz. Therefore the AD 534 linear modulator produces approximately 60/2.5 more noise than the CD 4053 switch. This is equivalent to a 27 db improvement when using a CD4053 over a linear modulator.

Gilbert modulators such as the 1496 or 1495 will produce low noise, i.e.< 5 nv//Hz when the carrier input of these devices switch the differential pairs on and off. This is achieved by either overriding the carrier input with a square wave carrier input with a square wave of> =/–200 mv or a large sine wave of > 1 v pp. When sinusoidal modulators such as the 1495 does not have the carrier inputs over driven to produce linear modulation, the noise is substantially higher versus a switch mode 1496 modulator. This is because the 2 differential pair transistors start amplifying their own noise. The internal base resistance of each transistor is usually about 50–200 ohms. If one assumes a 100 ohm series internal base resistors on the 2 pairs of differential pair transistors in series in a 1495 and 1 kohm load for one output a further assume that each of these transistors has a quiescent bias of 1 ma collector current, the output noise is then equal to ½* 1000 (gm) V nr= $V_o$ noise. gm= 38 ma/V for an $I_c$=1 ma. Therefore V nr=$\sqrt{400ohm*4kT}$= 2.5 nv $\sqrt{Hz}$. $V_o$ noise= 19 * 2.5 nv/$\sqrt{Hz}$=47.5 nv/$\sqrt{Hz}$ from a 1495 modulator. This is 19 times or 25 db more noise than the CD 4053 with an "on" resistance of 440 ohms. It should be noted that the output noise decreases in the 1495 or 1496 modulator as the carrier input is increased.

The key to the preferred embodiment is the use of a Low Pass Filter (LPF) after the first mixer which is to reject out a residual carrier from the first mixer and remove all sidebands related to harmonics of the carrier and the harmonics of the carrier. If this is not done, harmonics of the whistle frequency ($3f_a$–$3f_b$), ($5f_a$–$5f_b$) and etc. will appear at the descrambling output in an audible manner. This first LPF is generally a 7 pole or more elliptical filter with at least one zero tune to notch out the first mixer's carrier frequency, $f_A$. In practice a 9 pole active filter with general impedance convertors is the best choice for a stable and accurate filter. In the preferred embodiment the 3 db cut off of the first low pass filter is about 17 Khz with at least 40 db attenuation at 19 Khz.

A detailed description of the preferred embodiment is described below with reference to FIG. 5. The descrambling apparatus 12 has a scrambled audio signal input 60 and contains the descrambling process of the preferred embodiment. The scrambled audio 60 is inputed into a first input of a first mixer 63. The second input of this first mixer is a first carrier signal $f_A$ generated by frequency generator A, 61 which is approximately 19 Khz. The output first mixer 63 contains carrier feed through of $f_A$, all its sideband components and the harmonics. The output of mixer 63 is fed to a low pass filter 65 that filters out the first carrier, the upper sideband and all of the harmonics from signal 60. The output of low pass filter 65, signal 66 is fed into a first input of a second mixer 66. The second input of this second mixer is a second carrier signal $f_B$ generated by frequency generator B, 62 can be 16.4 Khz of 16.4 Khz±100 Hz shifted pseudo randomly for security reasons. See U.S. Pat. No. 5,095,279, VARIABLE FREQUENCY SINE CARRIER SIGNAL GENERATOR by Quan et al for a further explanation of this security process. The output of second mixer 70 contains the baseband descrambled audio, residual second carrier and upper sideband components above $f_B$'s frequency. The second low pass filter 71 with a cut-off frequency of approximately 12 Khz removes everything above 12 Khz, but passes the descrambled audio to the output line 72.

Figure 7:
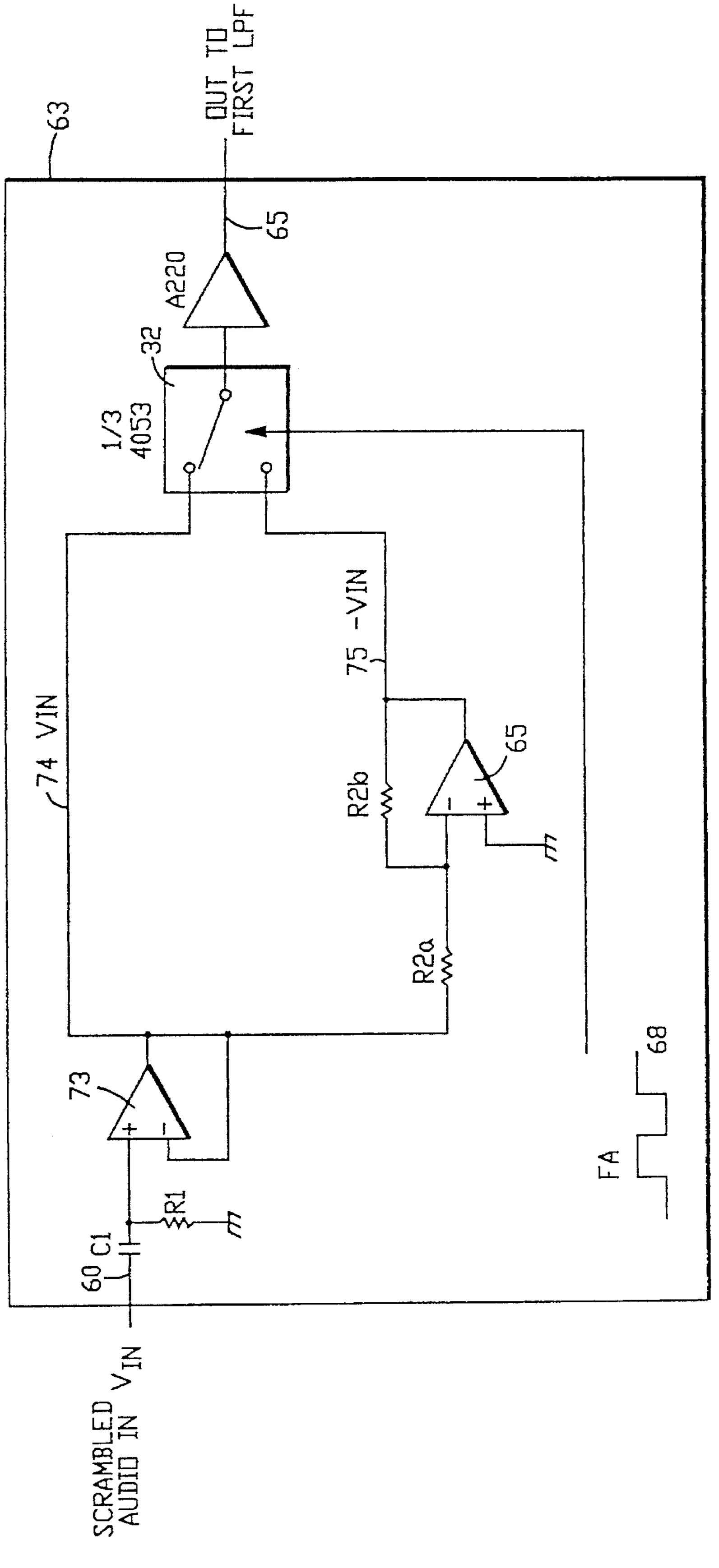
FIG. 7 is block diagram of a switch type low noise modulator.
Figure 8:
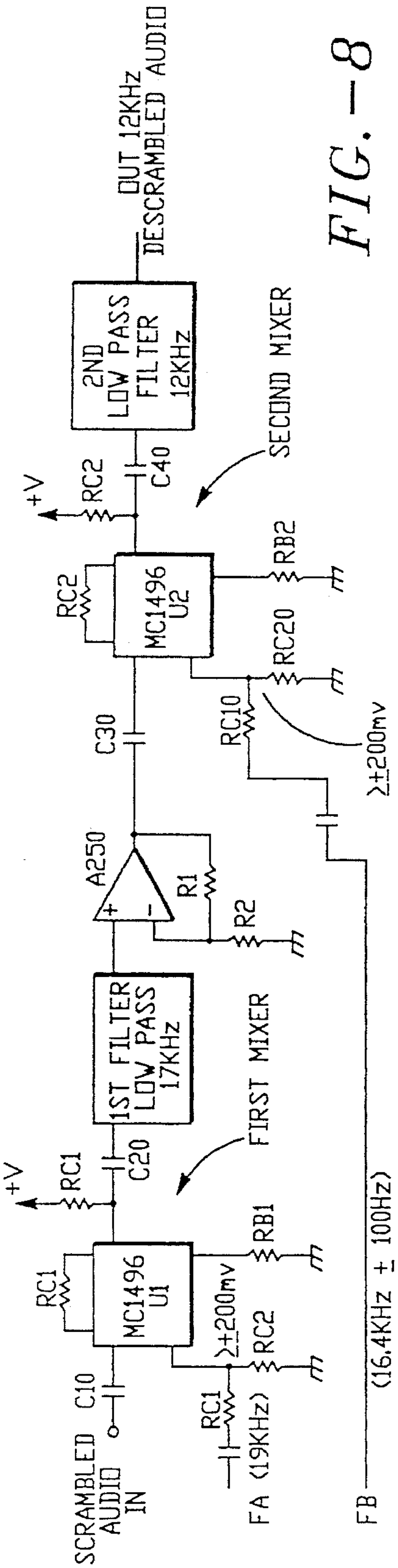
FIG. 8 is a block diagram of a first implementation a descrambler using the concepts of the invention.
Figure 9:
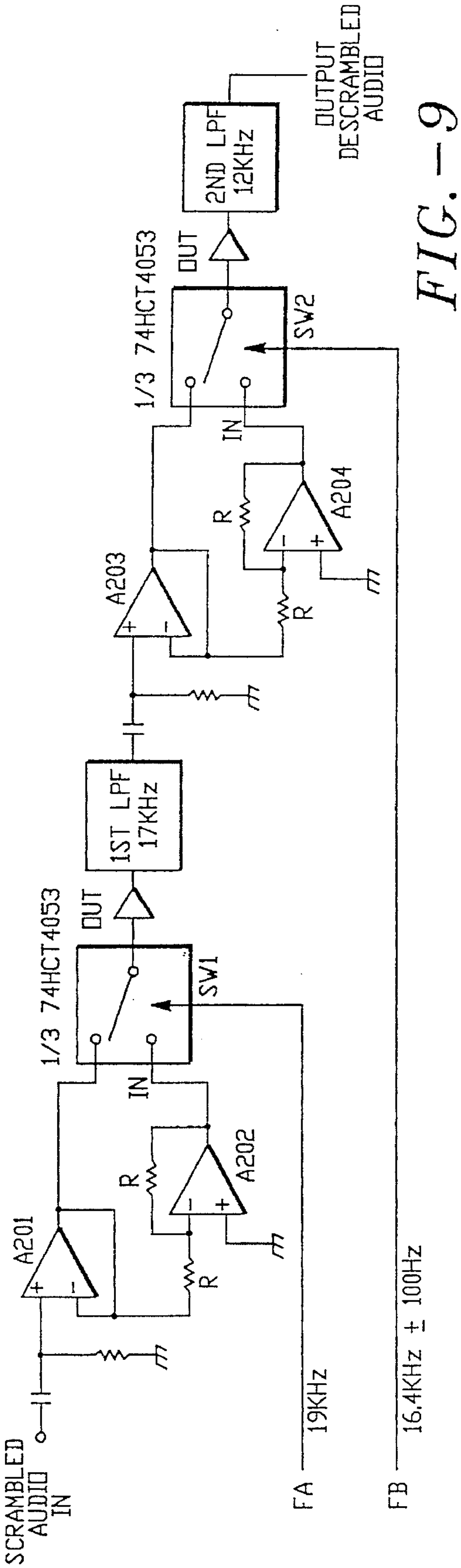
FIG. 9 is a block diagram of a second implementation of a descrambler using the concepts of the invention.
Figure 10:
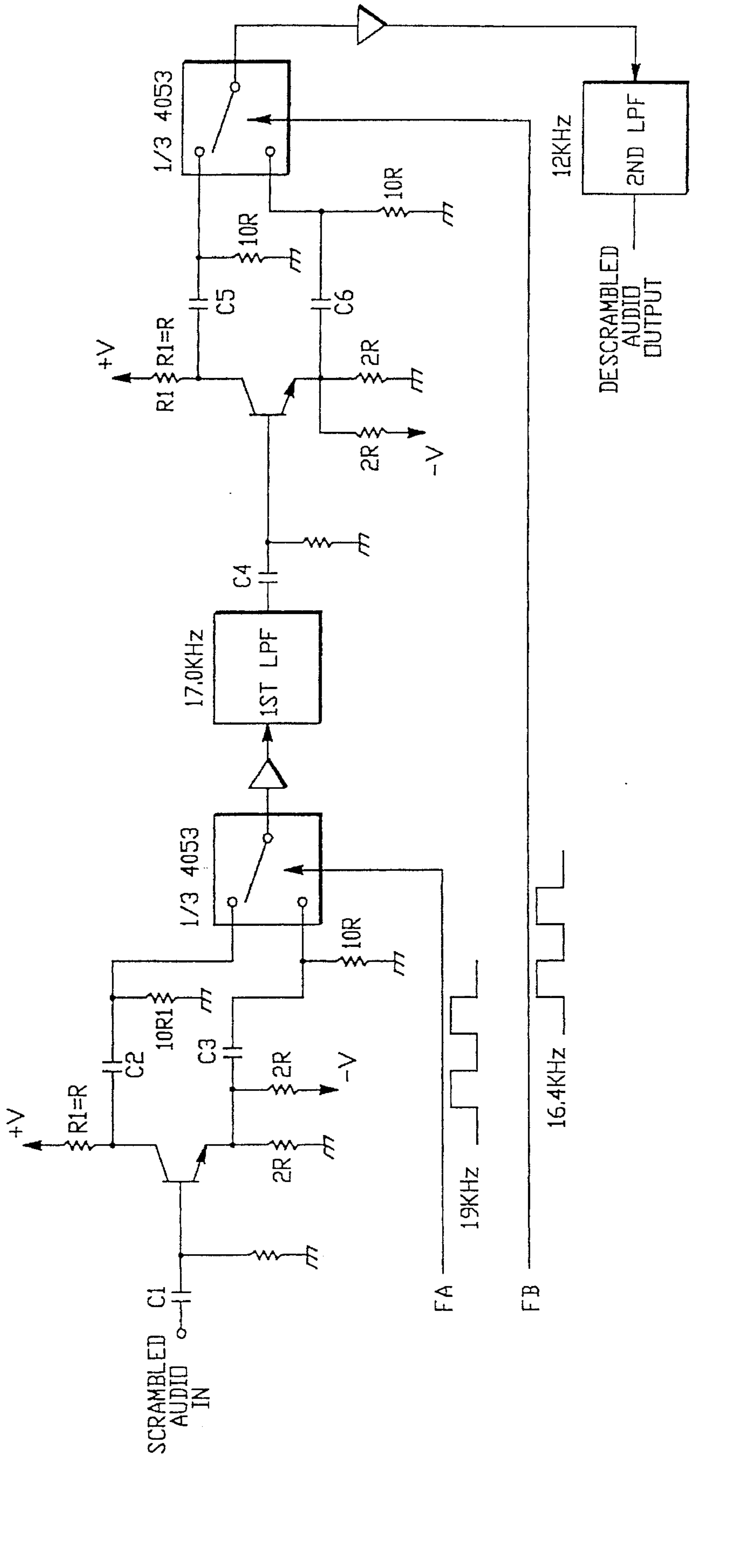
FIG. 10 is a block diagram of a third implementation of a descrambler using the concepts of the invention.

In the above preferred embodiment the mixers utilize a switch type low shot or thermal noise modulator as described in FIG. 7. The operation of this mixer will be described relative to the first mixer. The second mixer operate on the same principle. Scrambled audio 60 is fed into the + input of unity gain amplifier 73. The output of amplifier 73 is fed on line $V_{in}$ 74 to one input of a double pole single throw analog switcher 32. The output of 73 is also fed to the input of unity gain inversion amplifier consisting of R2a, R2b, and amplifier 65. The output of amplifier 65 is $-V_{in}$ 75 which is fed to a second input of the switcher 32. First carrier frequency $f_A$ is fed into the switching control input of the double pole, single throw switcher 32. The double pole, single throw switcher used is ⅓ of an 74HCT4053 or its equivalent and is fed to amplifier A220. A220 is the mixer output. For minimal carrier leakage of the output of mixer 65, the DC zero signal voltage of the two inputs of switch 32 $V_{in}$ and $-V_{in}$ must be exactly the same, i.e. 0 v. In addition the inversion amplifier 73 must be a –1 unity gain to have minimum scrambled audio in ($V_{in}$) feed through. Thus R2a= R2b within 1% or better is required for a wide band op amp 65 (i.e. NE5532).

Figure 13A:
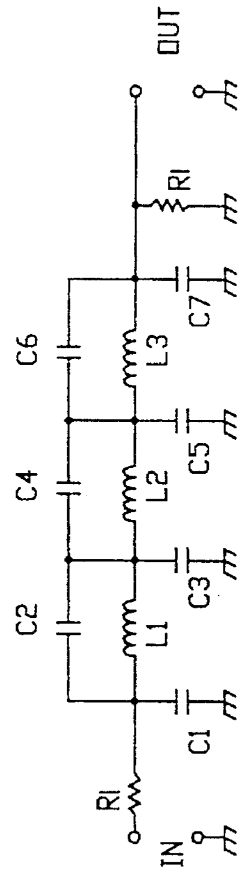
FIGS. 13*a*, 13*b* and 13*c* show implementations of the 1st and 2nd low pass filters of the invention.

FIG. 13 a shows a conventional RLC low pass filter with zeros for the descrambler's first low pass filter. Because inductors $L_1$ through $L_3$ are rather large 2 milli-henries through 20 milli-henries to achieve a low cost. These lower cost inductors suffer from a just adequate Q at audio frequencies. Much more expensive inductors with higher Q's will provide better low pass filtering, but will be beyond the budget of a low cost descrambling system.

Figure 13C:
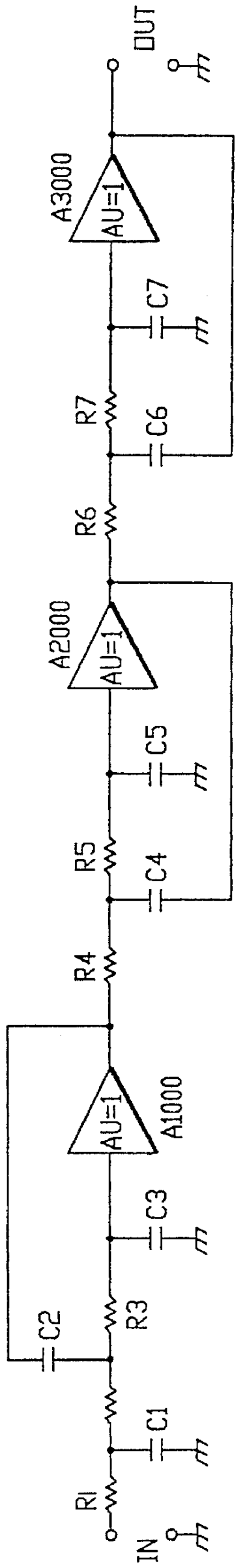
Figure 13B:
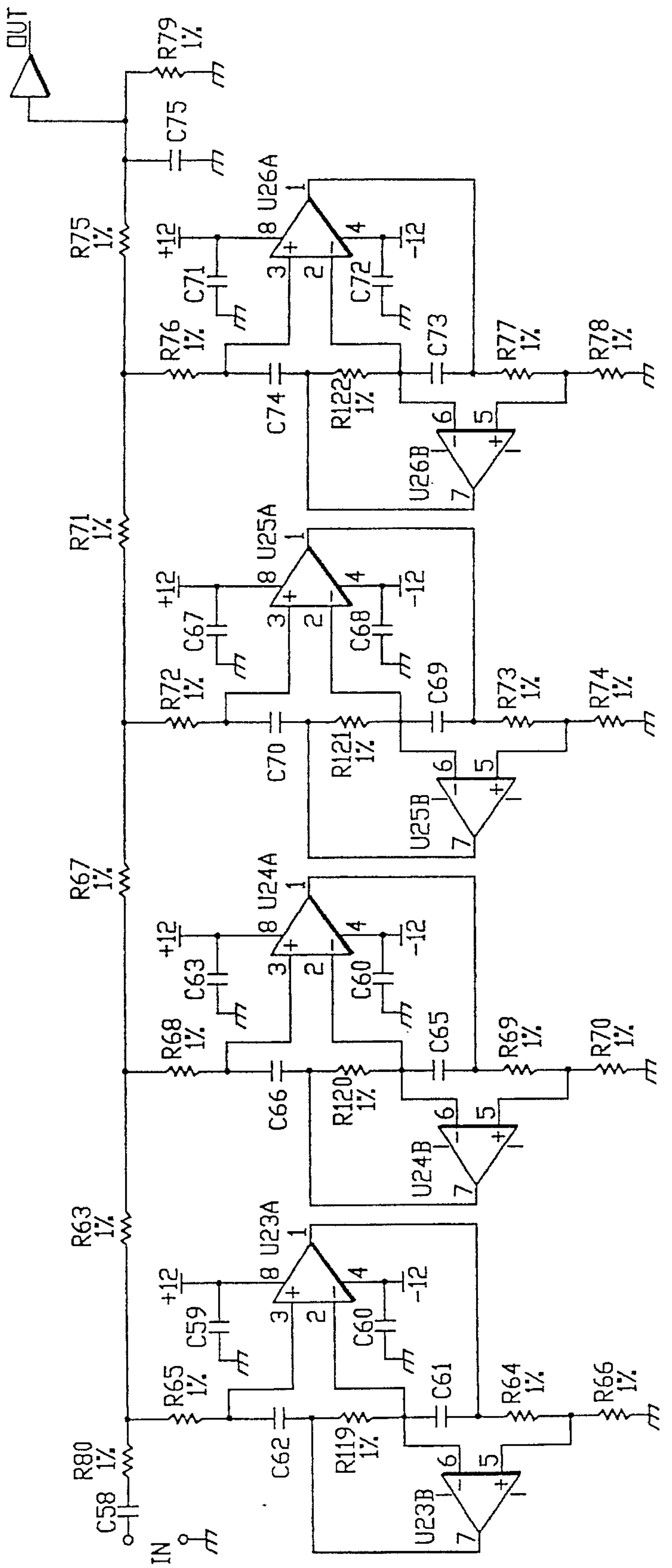

FIG. 13b shows an active 9 pole elliptic low pass filter that is not as sensitive to parts tolerance as many other active filters. This is important since $f_a$, the first carrier frequency must be filtered out by at least –40 db attenuation. FIG. 13b is a General Impedance Converter (GIC) active low pass filter that was found to provide very high performance in filtering at low cost. The capacitors can be inexpensive 5% mylar film capacitors. The resistors are inexpensive 1% resistors and the operational amplifiers can be common type such as TL082, NE5532 etc.

FIG. 13*c* shows an example of the 2nd filter as an active 7 pole low pass filter. Amplifiers A1000, A2000 and A3000 can be simple voltage followers of common operational amplifiers or single transistor emitter followers. The 2nd filter in the descrambler can any low pass filter, passive or active with sufficient stop band attenuation to provide a descrambled audio signal without measurable artifacts such 2nd carrier tone its upper sidebands and/or audible artifacts.

FIGS. 8–11 show various implementations using the concepts of the invention.

Figure 11:
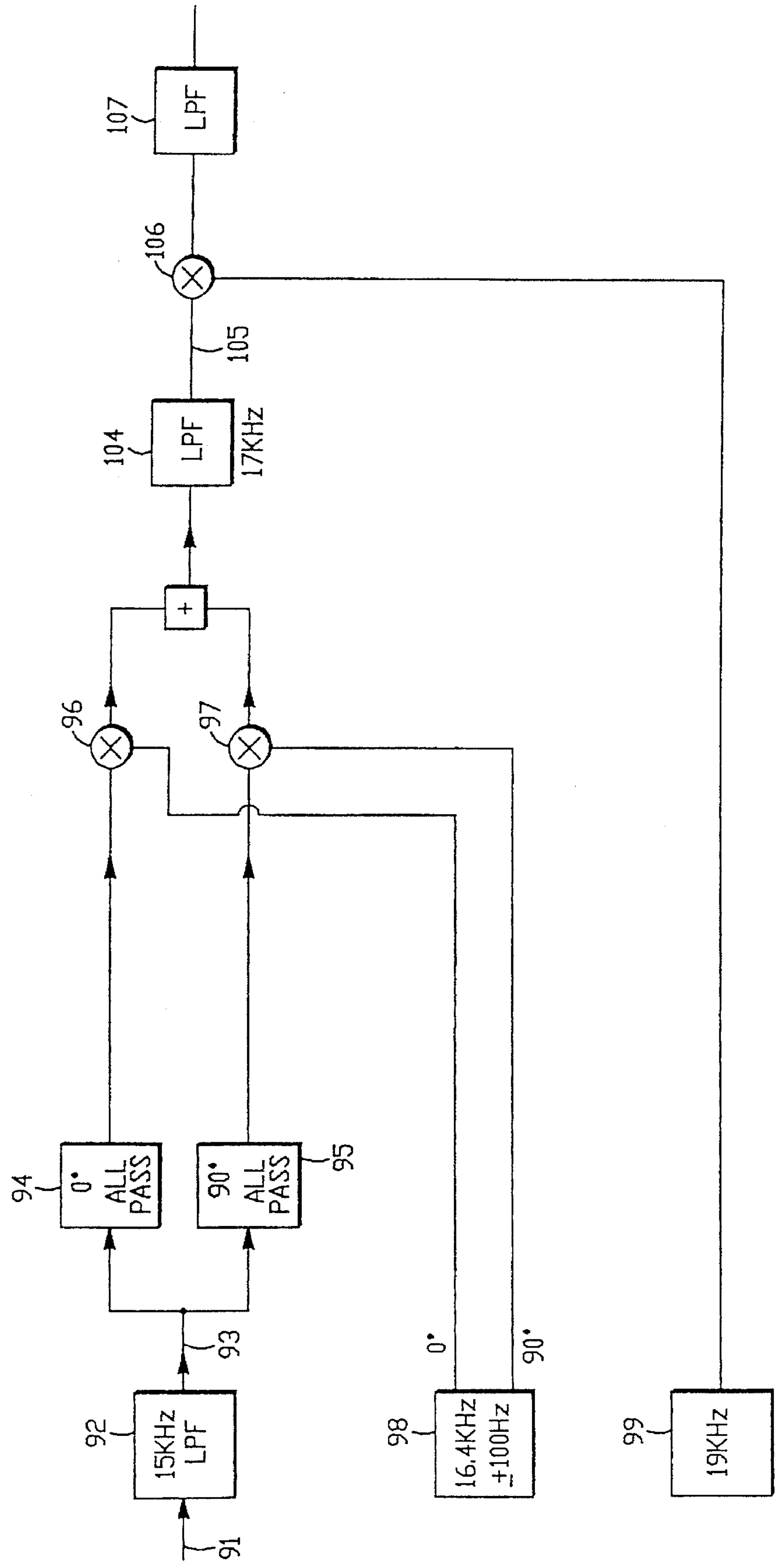
FIG. 11 is a block diagram of a preferred embodiment of scrambler using the concepts of the invention.

In addition to a descrambling system as described above many of the same elements can be used in a scrambler to achieve many of the same advantages achieved in the descrambler described above, i.e. lower shot noise output and less filter requirements than the prior art such as Forbes ('853). FIG. 11 is a block diagram and FIG. 12 is a series of spectral diagrams of a preferred embodiment of a scrambler.

An audio signal with a spectral response of about 30 Hz. to 15 Khz. 91 is fed into a low pass filter 92 to eliminate any unwanted signals beyond 15 Khz. The output of low pass filter 92, 93, is connected to 0 deg. and 90 deg. all pass phase shifters 94 and 95. The outputs of phase shifters 94 and 95 are in turn connected to first inputs of switch type low noise modulators 96 and 97.

Signal generator 98 generates a square wave signal at approximately 16.4 Khz. with 0° and 90° outputs which are connected to second inputs of modulators 96 and 97. The outputs of modulators 96 and 97 are summed to produce signal 103, a quadrarture modulated signal resulting in a residual 16.4 Khz. carrier with a lower sideband. FIGS. 13*a*–13*g* show the relationship of the quadrature modulated audio components to the original audio signal 91.

Figures 12A, 12B, 12C, 12D, 12E, 12F, 12G:
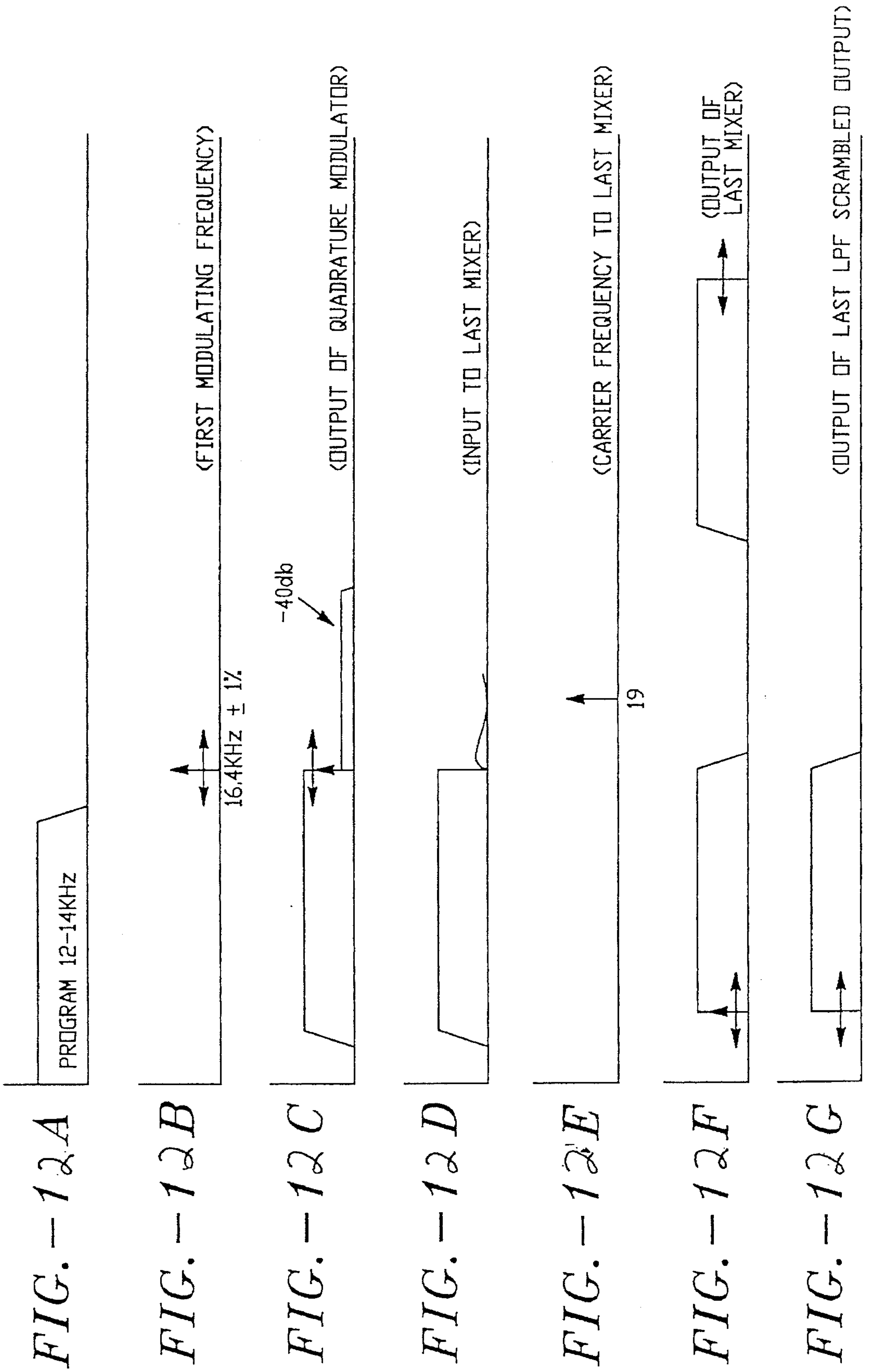
FIGS. 12*a*, 12*b*, 12*c*, 12*d*, 12*e*, 12*f* and 12*g* are spectral diagrams of the scrambler described in FIG. 11.

This quadrature modulated signal is fed through low pass filter 104 as signal 105 and is essentially the same filter as the first filter of the descrambler described above. This signal is connected to a first input of a third modulator 106. Modulator 106 is a switch type low thermal or shot noise modulator as described above and in shown in FIG. 7. A second carrier frequency is generated by a square wave oscillator 99 generating a frequency of approximately 19 Khz. as shown in FIG. 12*e*. The output of modulator 106 contains a 19 khz carrier and upper and lower sidebands. This signal is filtered by low pass filter 107 to produce a scrambled audio signal with an offset of approximately 2.6 Khz.

Theoretically, to decrease the dynamic artifacts caused by fast step frequency changes of the 16.4 Khz carrier in both the scrambler and descrambler, the low pass filters following the first quadrature mixer the first mixer of both the scrambler and descrambler respectively should be very nearly identical in group delay responses (transient responses). If the transient response characteristics of the low pass filters in the scrambler are different from the transient characteristics of the descrambler, the step changes of the 16.4 Khz carrier has to be slowed down to achieve minimal descrambling artifacts. It is preferred to have faster step changes in the secured carrier (16 Khz±100 Hz) and have the first low pass filter in the descrambler have the same characteristics as filter 104 in the scrambler of FIG. 11. In addition, the second low pass filter in the descrambler should have the same characteristics of filter 107 of the scrambler of FIG. 11. This permits the step shifting spectrum of the scrambler to be tracked quickly in the descrambler without artifacts caused by time delay skews between scrambler and descrambler tracking the 16 Khz stepped deviations. It should be noted that all carriers for all mixers in this invention for descramblers and scramblers should be preferably square wave signals for minimum artifacts.

While the above provides a full and complete description of the preferred embodiment of the invention, various modifications, alternate constructions and equivalents will occur to those skilled in the art. Therefore, the above descriptions and illustrations should not be construed as limiting the scope of the invention, which is defined by the appended claims.

What is claimed is:

1. A system of descrambling a scrambled non-inverted frequency translated audio signal capable of reproducing a spectral range of an original audio signal of about 50 Hz to about 15 Khz comprising:

a scrambled audio input signal, said input signal having a frequency range of 50 Hertz to substantially 15 Kilohertz;

means for generating a first modulation carrier signal having a frequency greater than the highest frequency in said scrambled audio input signal;

first modulating means for double sideband modulating said scrambled audio signal into said first modulation frequency, a first upper sideband signal and a first lower sideband signal;

first filtering means for filtering out said first modulation fundamental frequency, harmonics of said first modulation fundamental frequency, said upper sideband signal and harmonics from said double sideband signal produced by said harmonics of first modulation fundamental frequency and passing said first lower sideband signal;

means for generating a second modulation carrier frequency having a frequency less than said first modulation frequency;

a second modulating means for double sideband modulating said first lower sideband signal with said second modulation carrier frequency to produce a second modulating frequency, a second upper sideband signal and a second lower sideband signal;

means for filtering to pass said second lower sideband signal to produce a descrambled audio signal:

whereby use and selection of said first and second modulation carrier signals, said first and second modulation means and said first and second filter means is to produce a descrambled audio signal that contains substantially no audible whistle component at a low cost.

2. A system as in claim 1 wherein said means for generating said first and second modulation carriers comprise square wave generators.

3. A system as in claim 1 wherein said first modulating means and second modulating means comprise switch type low noise modulators.

4. A system as in claim 1 wherein said first filtering means comprises an elliptical filter containing at least seven poles and a zero to notch out said first carrier frequency.

5. A system as in claim 1 wherein said first filtering means comprises an active filter containing at least seven poles with general impedance convertors.

6. A system as in claim 1 wherein said second filtering means comprises a filter with seven or more poles.

7. A system as in claim 1 wherein said first modulation carrier generates a frequency of at least 19 Khz.

8. A system as in claim 1 wherein said second modulation carrier generates a frequency at least 500 Hz below the frequency of said first modulation frequency.

9. A system as in claim 8 wherein said second modulation carrier is pseudo randomly varied about±100 Hz.

10. A system as in claim 3 wherein said first and said second switch type low noise modulators comprise MC 1496 modulators.

11. A system as in claim 3 wherein said first switch type low noise modulators comprises an analog switch coupled to inverse polarities of said scrambled audio input signal.

12. A system as in claim 3 wherein said second switch type low noise modulators comprises an analog switch coupled to a positive polarity and a negative polarity of said first lower sideband signal.

13. A method of descrambling scrambled non-inverted frequency spectrum translated single sideband audio information signals capable of reproducing an original audio signal having a frequency of about 50 Hz to about 15 Khz said method comprising the steps of:

inputting a scrambled frequency single sideband audio input signal;

generating a first modulation carrier signal having a frequency greater than the highest frequency in the audio input signal;

double sideband modulating said scrambled audio signal into said first modulation frequency, a first upper sideband signal and a first lower sideband signal;

filtering out said first modulation fundamental frequency, harmonics, said upper sideband signal, harmonics from said double sideband signal produced by said harmonics of said first modulation fundamental frequency and all the harmonics of said lower sideband signal from said double sideband signal and passing said lower sideband signal;

generating a second modulation carrier frequency having a frequency less than said first modulation frequency;

double sideband modulating said first lower sideband signal with said second modulation carrier frequency to produce a second modulating frequency, a second upper sideband signal and a second lower sideband signal;

filtering out said second modulating frequency, a second upper sideband signal to pass said second lower sideband signal to produce a descrambled audio signal:

whereby using and selecting said first and second modulation carrier signals, said first and second modulation means and said first and second filter means produces said descrambled audio signal containing substantially no audible whistle component.

14. A method as in claim 13 wherein said means for generating said first and second modulation carriers comprise square wave generators.

15. A method as in claim 13 wherein said first and second double sideband modulators comprise switch type low shot and thermal noise modulators.

16. A method as in claim 13 wherein said filtering out said first modulation frequency and all its harmonics, said upper sideband signal and all the harmonics from said double sideband signal and passing said lower sideband signal uses an elliptical filter containing at least seven poles and a zero to notch out said first carrier frequency.

17. A method as in claim 13 wherein said filtering out of said first modulation frequency and all its The Applicant has amended, said upper sideband signal and all said harmonics from said double sideband signal and passing said lower sideband signal uses an active filter containing at least seven poles with general impedance convertors.

18. A method as in claim 13 wherein said second filtering of second modulating frequency, a second upper sideband signal and a second lower sideband signal comprises filter of seven or more poles.

19. A method as in claim 13 wherein said first modulation carrier generates a frequency of at least 19 Khz.

20. A method as in claim 13 wherein said second modulation carrier generates a frequency less than said first modulation carrier by at least 500 Hz.

21. A method as in claim 13 wherein said second modulation carrier generates a frequency about 2.6 Khz less than said first modulation carrier.

22. A method as in claim 13 wherein said second modulation carrier generates a frequency that is pseudo randomly varied.

23. A method as in claim 15 wherein said first and said second switch type low shot noise modulators comprise switched Gilbert multipliers 24. A method as in claim 15 wherein said first switch type low noise modulators comprises an analog switch coupled to a positive polarity and a negative polarity and negative polarity of said scrambled audio input signal.

25. A method as in claim 15 wherein said second switch type low shot noise modulators comprise a analog switch coupled to a positive polarity and a negative polarity of said first lower sideband signal.

26. A method as in claim 15 wherein said first switch type low noise modulators comprise chopper switch modulators.

27. A method as in claim 15 wherein said second switch type low shot noise modulators comprise chopper switch modulators.

28. A system of scrambling of original audio signal having a frequency range 50 Hz to about 15 Khz produce a non-inverted frequency translated signal comprising:

an audio input signal with a frequency range of 50 Hz. to 15 KHz.;

means for generating a first modulation carrier signal having a frequency greater than the highest frequency in the original audio signal;

first modulating means for quadrature sideband modulating said original audio signal into a first lower sideband signal;

first filtering means for filtering out said first modulation fundamental frequency and at least a majority of harmonic frequencies of said first modulation fundamental frequency, said upper sideband signal and harmonic signals produced by said quadrature signal and passing said first lower sideband signal;

means for generating a second modulation carrier frequency having a frequency higher than said first modulation frequency;

second modulating means for double sideband modulating said first lower sideband signal with said second modulation carrier frequency to produce a second modulating frequency, a second upper sideband signal and a second lower sideband signal;

means for filtering to pass said second lower sideband signal to produce a scrambled audio signal;

whereby use and selection of said first and second modulation carrier signals, said first and second modulation means and said first and second filter means is to produce a scrambled audio signal at a low cost.

29. A system as in claim 28 wherein said means for generating said first and second modulation carriers comprises a square wave generator.

30. A system as in claim 28 wherein said second modulating means comprise switch type low noise modulators.

31. A system as in claim 28 wherein said first filtering means comprises an elliptical filter containing at least seven poles.

32. A system as in 28 wherein said first filtering means comprises a filter without having to tune out said first frequency.

33. A system as in claim 28 wherein said first filtering means comprises an active filter containing at least seven poles with general impedance convertors.

34. A system as in claim 28 wherein said second filtering means comprises a filter of seven or more poles.

35. A system as in claim 28 wherein said first modulation carrier generates a frequency of at least 16.4 Khz.

36. A system as in claim 28 wherein said second modulation carrier generates a frequency at least 500 Hz above said first modulation carrier.

37. A system as in claim 28 wherein said second modulation carrier generates a frequency that is pseudo randomly varied by about ±100 Hz.

38. A system as in claim 30 wherein said switch type low noise modulator comprises a differential pair balanced multiplier type modulator.

39. A system as in claim 30 wherein said second switch type low noise modulator comprises an analog switch coupled to inverse polarities of said first upper sideband signal.

40. A method of scrambling of an original audio signal producing a non-inverted frequency translated signal said method comprising the steps of:

inputting an audio signal with a frequency range of 50 Hz. to 15 KHz.;

generating a first modulation carrier signal having a frequency greater than the highest frequency in the original audio signal;

quadrature modulating said original audio signal into a first lower sideband signal;

filtering out said first modulation fundamental frequency and harmonics of said first modulation frequency, said upper sideband signal, harmonics from said modulated signal produced by said harmonics of said first modulation fundamental frequency and passing said first lower sideband signal;

generating a second modulation carrier frequency having a frequency higher than said first modulation frequency;

double sideband modulating said first lower sideband signal with said second modulation carrier frequency to produce a second modulating frequency, a second upper sideband signal and a second lower sideband signal;

filtering second modulating frequency, said second upper sideband signal and said second lower sideband signal to pass said second lower sideband signal to produce a scrambled audio signal;

whereby use and selection of said first and second modulation carrier signals, said first and second modulation means and said first and second filter means is to produce a descrambled audio signal at a low cost.

41. A method as in claim 40 wherein said first and second modulation carriers generators comprise square wave generators.

42. A method as in claim 40 wherein said double sideband modulator comprises a switch type low noise modulator.

43. A method as in claim 40 wherein said filtering out said first modulation frequency and all its harmonics, said upper sideband signal and all the harmonics from said double sideband signal and passing said lower sideband signal; uses an elliptical filter containing at least seven poles and zero tune notch tuned to notch out said first carrier frequency.

44. A method as in claim 40 wherein said filtering out of said first modulation frequency and all its harmonics, said upper sideband signal and all the harmonics from said double sideband signal and passing said lower sideband signal uses an active filter containing at least seven poles with general impedance convertors.

45. A method as in claim 40 wherein said second filtering of second modulating frequency, a second upper sideband signal and a second lower sideband signal comprises a filter of seven or more poles.

46. A method as in claim 40 wherein said first modulation carrier generates a frequency of at least 16.4 Khz.

47. A method as in claim 40 wherein said second modulation carrier generates a frequency at least 50 Hz greater than said first modulation carrier frequency.

48. A method as in claim 40 wherein said second modulation carrier generates a frequency that is pseudo randomly varied about a frequency substantially equal to 19 Khz.

49. A method as in claim 40 wherein said switch type low noise modulator comprises a differential pair, balanced multiplier type modulator.

50. A method as in claim 40 wherein said switch type low noise modulator comprises a analog switch coupled to a positive polarity and a negative polarity of said upper sideband signal.

* * * * *